UNITED STATES PATENT OFFICE 2,419,713

SAW BLADE LUBRICANT

Edmund L. Flood, San Diego, Calif., assignor to Consolidated Vultee Aircraft Corporation, San Diego, Calif., a corporation of Delaware No Drawing. Application June 28, 1946, Serial No. 680,079

6 Claims. (Cl. 252—36)

This invention relates to lubricants for saws and more particularly to a sodium base grease lubricant composition which is particularly adapted for use with high speed band saws.

A primary factor in the loss of life of a saw blade is heat developed during the operation of the saw blade. This heat is responsible for premature wear along the blade sides and causes the blade to become thin, work hardened and brittle. Premature wearing of the blade causes it to quickly lose its "set" and thereby greatly retards its cutting action. Premature wearing further results in excessive vibration of the saw blade in operation and renders it difficult to hold tolerances.

Lubricants have been used heretofore in an effort to reduce or hold down the operating temperature of saw blades and thereby prolong their life. These lubricants have been usually in the form of liquid coolants or oils, graphite and solids but have been found to be unsatisfactory in use.

The primary objections to the use of liquid coolants lie in that the liquid would spread over the entire area of the saw blade and had the tendency to collect shavings and dust. Further the oil would spread to the work being cut and deposit a film thereover which collects chips and shavings.

The graphite lubricants are unsatisfactory in that they make the work unnecessarily dirty and are very difficult to remove.

The solid lubricants heretofore known have not satisfactorily prolonged the life of a saw blade and themselves are wasted by the action of the saw blade thereon.

It is therefore an object of the present invention to provide a lubricant of improved composition which overcomes the foregoing defects inherent in prior art lubricants used with band saw blades. This lubricant will maintain a lower temperature during the blade operation, and thereby prolong the life of the blade and make it more efficient in operation. Also this lubricant will more readily and more satisfactorily lubricate the entire saw blade and without waste. Another advantage lies in that there will be no film on the saw blade or the part being worked to which dust and waste particles will readily adhere. The lubricant composition of this invention has other advantages which will be readily apparent from the following description of the composition.

In accordance with the invention the saw blade lubricant composition comprises a soda base grease, turpentine, a relatively high melting point wax, preferably a petroleum wax, and aluminum stearate. It is here noted that the proportions of the constituents of this composition are critical and any substantial variation from the proportions set forth herein will impair the effectiveness of the composition as a saw blade lubricant.

The most satisfactory lubricants produced in accordance with this invention usually contain from about 20% to 30% of the soda base grease; from about 4% to 5% of turpentine; from about 70% to 80% of the wax; and from about .5% to .7% of the aluminum stearate; all taken on a weight basis.

The soda base grease may be formed by incorporating into a suitable mineral oil, preferably one having high flash and fire points, a desired percentage, say about 15 to 50%, of the sodium soap of tallow, stearic acid, hydrogenated fatty acids or the like or the sodium soap of any mixture of soap forming stocks. The preferred soda base grease is one produced by incorporating from about 15 to 23% of a sodium base soap, based on the weight of the grease, in a high viscosity lubricating oil or a mixture of such oils which contains dissolved or suspended therein a small amount, say 1 to 1.4% of petrolatum. The preferred lubricating oil is petroleum Bright Stock alone or in combination with a mineral lubricating oil having a viscosity of 550 seconds, Saybolt, at 100° F.

The relatively high melting point wax of the composition of this invention is paraffin wax having a melting point higher than the melting points of the typical varieties of paraffin wax commercially available. Thus, the paraffin wax may have a melting point of about 143° to 170° F., preferably 160° to 165° F. Other waxes having melting points above about 143° F. such as carnauba wax, ceresin wax, candelilla wax and the like may be used, but the paraffin wax is preferred.

The cutting oil preferred for use in this invention is turpentine, but rosin oil and pine oil may be used.

The soda base grease serves as a vehicle for the turpentine, the cutting oil, and provides a smooth finish to the cut in the work made by the saw blade. The relatively high percentage of mineral oil in the soda base grease serves as an excellent heat conductor and makes possible the cutting of metals at temperatures lower than heretofore. The large amount of the high melting point wax used serves to maintain the lubricant in a solidified state and prevents the oil and turpentine from draining therefrom. The aluminum stearate serves to keep the composition uniform and stable and imparts film strength to the mineral oil and provides anti-welding properties to the lubricant and makes possible the clean cutting through metal without welding of chips and shavings to the teeth of the saw blade.

An example of a preferred saw blade lubricant formulated in accordance with the present invention follows:

| | Per cent |
|---|---|
| Paraffin wax (165° F. melting point) | 71.39 |
| Soda base grease (17% soap content) | 23.79 |
| Turpentine | 4.19 |
| Aluminum stearate | 0.63 |

The soda base grease is heated to a temperature of about 165° F. and the turpentine and the aluminum stearate are added. The paraffin wax is heated to its melting point and added to the grease, turpentine and aluminum stearate mixture and the whole thoroughly mixed. With the mixture still at approximately 165° F. it is poured into molds and allowed to cool and solidify. On removal from the molds the lubricant is dusted with soap-stone to facilitate handling thereof. The lubricant is best adapted for use in stick form and when used with a saw blade is so disposed as to bear against a side of the saw blade including the sides of the saw teeth to effectively lubricate it as it operates.

It is understood that the foregoing example is to be taken as illustrative and the invention is to be limited only as indicated in the appended claims.

What I claim is:

1. A saw blade lubricant composition comprising on a weight basis, from 70 to 80% of a wax having a melting point of at least about 143° F. taken from the group consisting of paraffin wax, carnauba wax, ceresin wax and candelilla wax, from 20 to 30% of a soda base grease, from 4 to 5% of a cutting oil taken from the group consisting of turpentine, rosin oil and pine oil and .5 to .7% of aluminum stearate.

2. A saw blade lubricant composition comprising, on a weight basis, from 70 to 80% of paraffin wax having a melting point of at least about 143° F., from 20 to 30% of a soda base grease, from 4 to 5% of turpentine and .5 to .7% of aluminum stearate.

3. A saw blade lubricant composition comprising, on a weight basis, from 70 to 80% of paraffin wax having a melting point of at least about 143° F., from 20 to 30% of a soda base grease comprising, on a weight basis, from 15 to 23% of a sodium base soap, from 1 to 1.4% of petrolatum and the remainder a high viscosity mineral lubricating oil, from 4 to 5% of turpentine and .5 to .7% of aluminum stearate.

4. A saw blade lubricant compound consisting of, about 71.39% of paraffin wax having a melting point of about 165° F., about 23.79% of soda base grease, about 4.19% of turpentine and about 0.63% of aluminum stearate.

5. A saw blade lubricant compound consisting of about 71.39% of paraffin wax having a melting point of about 165° F., about 23.79% of soda base grease which comprises on an approximate weight basis, 17% of soda base soap and in excess of 80% of a high viscosity lubricating oil, about 4.19% of turpentine and about 0.63% of aluminum stearate.

6. A saw blade lubricant compound consisting of about 71.39% of paraffin wax having a melting point of about 165° F., about 23.79% of soda base grease which comprises on an approximate weight basis, 17% of soda base soap and in excess of 80% of a high viscosity lubricating oil, consisting of petroleum Bright Stock and a lubricating oil having a viscosity of 550 seconds, Saybolt at 100° F., about 4.19% of turpentine and about 0.63% of aluminum stearate.

EDMUND L. FLOOD.

REFERENCES CITED

The following references are of record in the file of this patent:

UNITED STATES PATENTS

| Number | Name | Date |
|---|---|---|
| 2,408,385 | Flood | Apr. 16, 1945 |